(12) United States Patent
Stewart

(10) Patent No.: US 8,164,472 B2
(45) Date of Patent: Apr. 24, 2012

(54) SYSTEM AND METHOD FOR MONITORING A JUMP LANDING AREA

(76) Inventor: David James Stewart, Zephyr Cove, NV (US)

( * ) Notice: Subject to any disclaimer, the term of this patent is extended or adjusted under 35 U.S.C. 154(b) by 317 days.

(21) Appl. No.: 12/412,946

(22) Filed: Mar. 27, 2009

(65) Prior Publication Data

US 2010/0123593 A1 May 20, 2010

Related U.S. Application Data

(63) Continuation-in-part of application No. 29/317,028, filed on Apr. 22, 2008.

(60) Provisional application No. 61/115,329, filed on Nov. 17, 2008.

(51) Int. Cl.
*G08B 21/00* (2006.01)

(52) U.S. Cl. ..... 340/670; 340/540; 340/523; 340/573.1; 340/556; 340/686.1; 348/240.99; 348/157; 280/11; 280/11.36; 280/617

(58) Field of Classification Search ............... 340/523, 340/573.1, 556, 686.1, 540, 670; 702/158; 280/11, 11.36, 617; 348/240.99, 157
See application file for complete search history.

(56) References Cited

U.S. PATENT DOCUMENTS

| 3,505,878 | A | * | 4/1970 | Moll | 73/490 |
|---|---|---|---|---|---|
| 4,089,057 | A | * | 5/1978 | Eriksson | 702/158 |
| 4,262,537 | A | * | 4/1981 | Jander et al. | 73/490 |
| 4,546,650 | A | * | 10/1985 | Cameron | 73/490 |
| 5,003,820 | A | * | 4/1991 | Dittbrenner | 73/181 |
| 6,533,296 | B1 | * | 3/2003 | Farraday | 280/14.22 |
| 6,718,058 | B2 | * | 4/2004 | Ochi et al. | 382/154 |
| 7,414,528 | B2 | * | 8/2008 | Crichton | 340/540 |
| 2002/0052236 | A1 | * | 5/2002 | Kohira et al. | 463/31 |
| 2003/0069052 | A1 | * | 4/2003 | Higashiyama et al. | 463/4 |
| 2006/0187019 | A1 | * | 8/2006 | Crichton | 340/523 |
| 2007/0026974 | A1 | * | 2/2007 | Marty et al. | 473/467 |
| 2009/0040301 | A1 | * | 2/2009 | Sandler et al. | 348/143 |
| 2009/0066490 | A1 | * | 3/2009 | Mitzutani et al. | 340/435 |
| 2010/0148483 | A1 | * | 6/2010 | Kopp et al. | 280/809 |
| 2010/0197416 | A1 | * | 8/2010 | Brown | 472/90 |
| 2011/0071792 | A1 | * | 3/2011 | Miner | 702/182 |
| 2011/0131012 | A1 | * | 6/2011 | Czaja et al. | 702/188 |
| 2011/0267189 | A1 | * | 11/2011 | Stewart | 340/533 |

* cited by examiner

*Primary Examiner* — Hoi Lau
(74) *Attorney, Agent, or Firm* — Kerr IP Group, LLC; Michael A. Kerr

(57) ABSTRACT

A jump safety system and method for monitoring a jump landing area is described. The system of examining a landing area associated with the jump includes a camera, a memory, a processor, an image processing module, and a light emitting output. The camera is positioned to generate a camera output that displays the landing area. The landing area has a declining slope angle that reduces a landing force in relation to the slope angle. The image processing module, which is controlled by the processor, determines a landing area clear status by analyzing the camera output and determining the landing area is clear of obstructions. A landing area obstruction status is determined by identifying that there is an obstruction in the landing area. The light emitting output communicates either the landing area clear status or the landing area obstruction status.

26 Claims, 6 Drawing Sheets

SYSTEM AND METHOD FOR MONITORING A JUMP LANDING AREA

CROSS REFERENCE TO RELATED APPLICATIONS

This application Ser. No. 12/412,946 is a continuation-in-part of Design Pat. Application No. 29/317,028 filed Apr. 22, 2008, and this application Ser. No. 12/412,946 is related to Provisional Patent Application 61/115,329 filed Nov. 17, 2008. This application is also related to co-pending Non-provisional patent application Ser. No. 12/413,072, entitled SYSTEM AND METHOD FOR MONITORING JUMP VELOCITY, filed Mar. 27, 2009. All applications listed in this paragraph are hereby incorporated by reference.

FIELD OF THE INVENTION

This invention relates to a jump safety system and method for monitoring a jump landing area. More particularly, the system and method monitors the area around a jump and informs riders of a jump related obstruction or a landing clear status.

BACKGROUND

Snow sports such as skiing and snowboarding are popular sports with continuously evolving technology and practices. One common activity in snow sports is taking a "jump." To use a jump, the rider approaches the jump area at high speed. The rider leaves the snow at the edge or lip of the jump, continues through the air, and ideally lands in the "landing area." The landing area is a sloped surface designed to minimize impact force upon landing. A jump area generally comprises an angled jump where the rider actually leaves the snow, the tabletop or gap, the landing area, and the run-out area.

The jump may be part of ski run or in a terrain park. A terrain park is an area of a snow resort that includes designed features analogous to a skate park, allowing skiers, snowboarders and the like (referred to as "riders") to perform tricks including grinds, taps, and jumps in a similar fashion to skateboarders.

There are hazards associated with the use of jumps. One is that the landing area is not usually visible from the lip of the jump. Additionally, obstructions in the landing area pose a high risk of injury to the rider, who cannot substantially adjust jump trajectory after leaving the surface of the snow.

The most common obstructions found in the landing area are spectators and other riders. Sometimes uninformed people wander into the landing area because they simply do not understand the safety risk they are posing to themselves and to others. Other times a rider may be too injured to clear the landing area quickly, or at all.

One solution to this problem is to use a spotter. A spotter is a person who stands near the jump in such a way as to see whether there are obstructions in the landing area and signals to waiting riders to go when the area is clear. However, while many resorts provide terrain parks with jumps, few provide spotters for jumps. An automated system that can detect the presence of people and other obstructions in the landing area and convey that information to waiting riders is needed.

Another hazard associated with jumps is speed. If the rider is not moving at an appropriate speed when airborne, the rider may land in an area other than the landing area. If the rider is moving too slowly, the jump may not be 'cleared', resulting in the rider missing the landing area short and instead landing in the tabletop or gap area. If the rider is moving too fast, the jump may extend past the sloped landing area, causing the rider to land in the flatter run-out area. Landing in either of these areas subjects the rider's body to much higher impact forces than landing in the appropriately sloped area. It is largely left to the rider's experience to determine whether a given speed is safe for a given jump.

Several U.S. Pat. Nos. including 3,505,878; 4,546,650; 5,003,820; 6,533,296; and 4,262,537 disclose ski-mounted devices that can measure speed, but these systems cannot effectively convey information in real time because the displays are mounted on the ski device or on the rider, making them difficult, and perhaps even dangerous, to view while actively skiing or snowboarding. Further, these systems do not provide information about an optimal speed range in relation to a jump.

In U.S. Pat. No. 7,414,528, an automated system for improving skier safety is described. This system signals whether a previous skier has failed to leave the landing area, but it does not convey information about other obstructions or hazards that may be present in the landing area. Further, this system does not detect people who have wandered into the jump landing area from an area other than the location of the jump.

SUMMARY

A jump safety system and method for monitoring a jump landing area is described. The system of examining a landing area associated with the jump includes a camera, a memory, a processor, an image processing module, and a light emitting output. The camera is positioned to generate a camera output that displays the landing area. The landing area has a declining slope angle that reduces a landing force in relation to the slope angle. The camera supplies a video stream that is sampled and captured by the memory and analyzed by the processor using the image processing module. The image processing module, which is controlled by the processor, determines a landing area clear status by analyzing the camera output and determining the landing area is clear of obstructions. A landing area obstruction status is determined by identifying that there is an obstruction in the landing area. The light emitting output communicates either the landing area clear status or the landing area obstruction status.

In one illustrative embodiment, the components of the system and method for monitoring a jump landing area are mounted in a housing or frame. Also mounted to the frame is a surface gliding system that allows the frame to be moved easily over snow-covered surfaces and a surface stabilization system that allows the frame to be fastened into the snow. In this embodiment, the camera is mounted on a pole high above the rest of the system to obtain a better view of the landing area. A camera positioning system allows the camera to be pointed at the landing area. A camera aiming system allows the camera to be focused on the monitoring area, which includes the all or part of the landing area.

A method for examining a landing area associated with a jump includes positioning a camera to point at the landing area, aiming and focusing the camera to provide a monitored area, and recording the camera output. The method proceeds to analyze the camera output by determining whether landing area status is 'clear' or 'obstructed' and communicating that status to a light emitting output.

DRAWINGS

The present invention will be more fully understood by reference to the following drawings which are for illustrative, not limiting, purposes.

Figure 3:
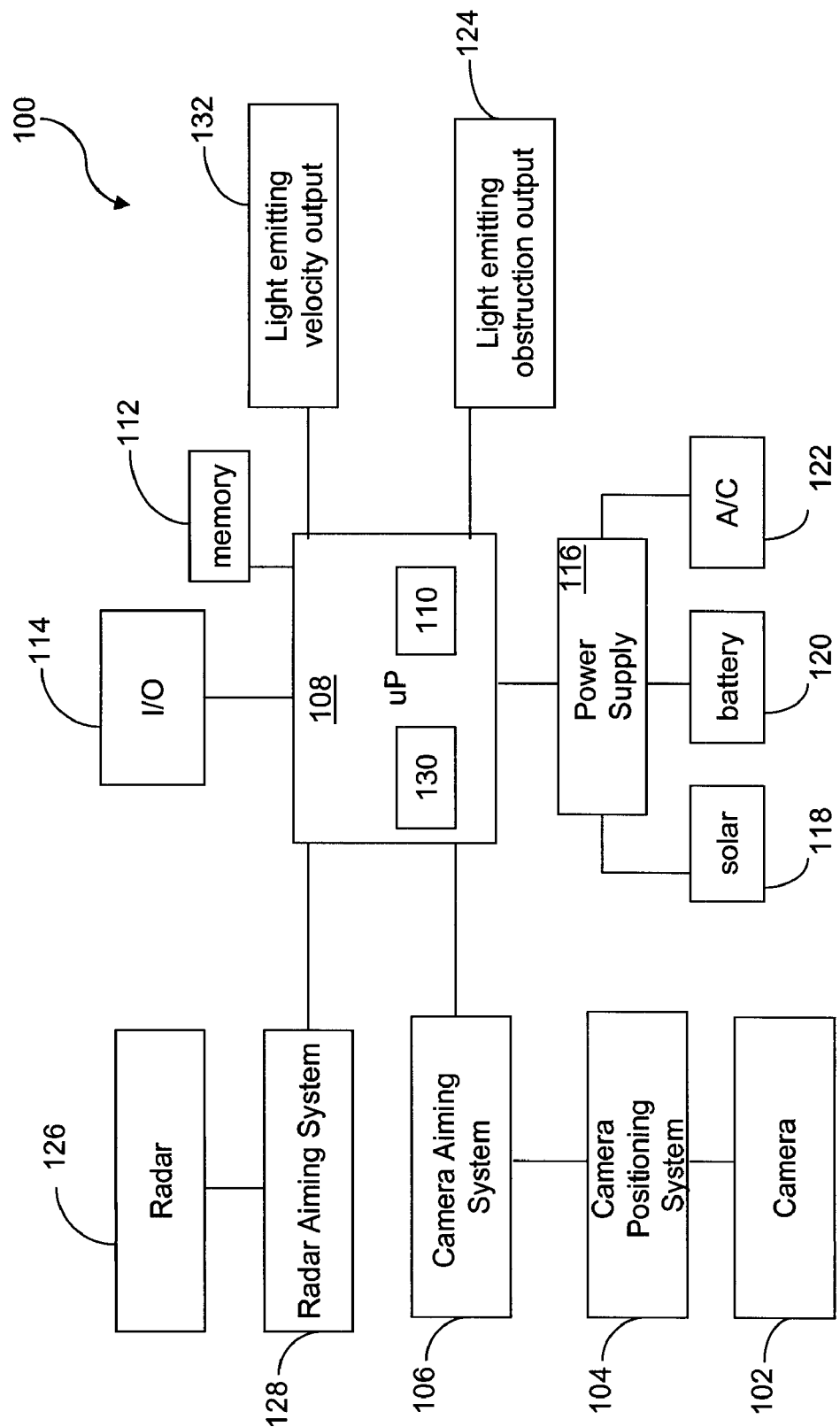
FIG. 3 shows a jump safety system diagram for monitoring a landing area and monitoring a jump velocity.
Figure 4:
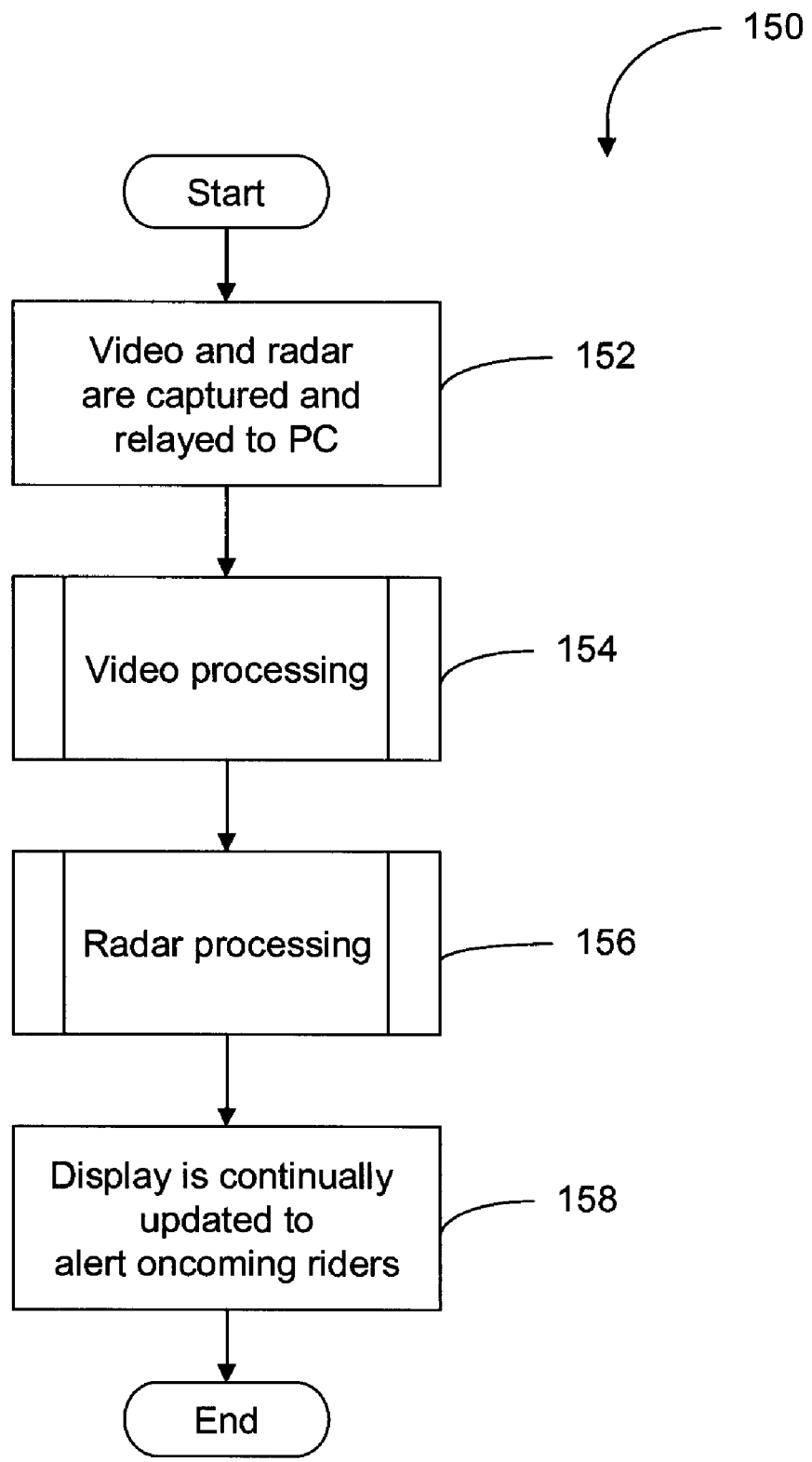

FIG. 4 presents a high-level flow chart of a method for performing the system operations described in FIG. 3.

Figure 5:
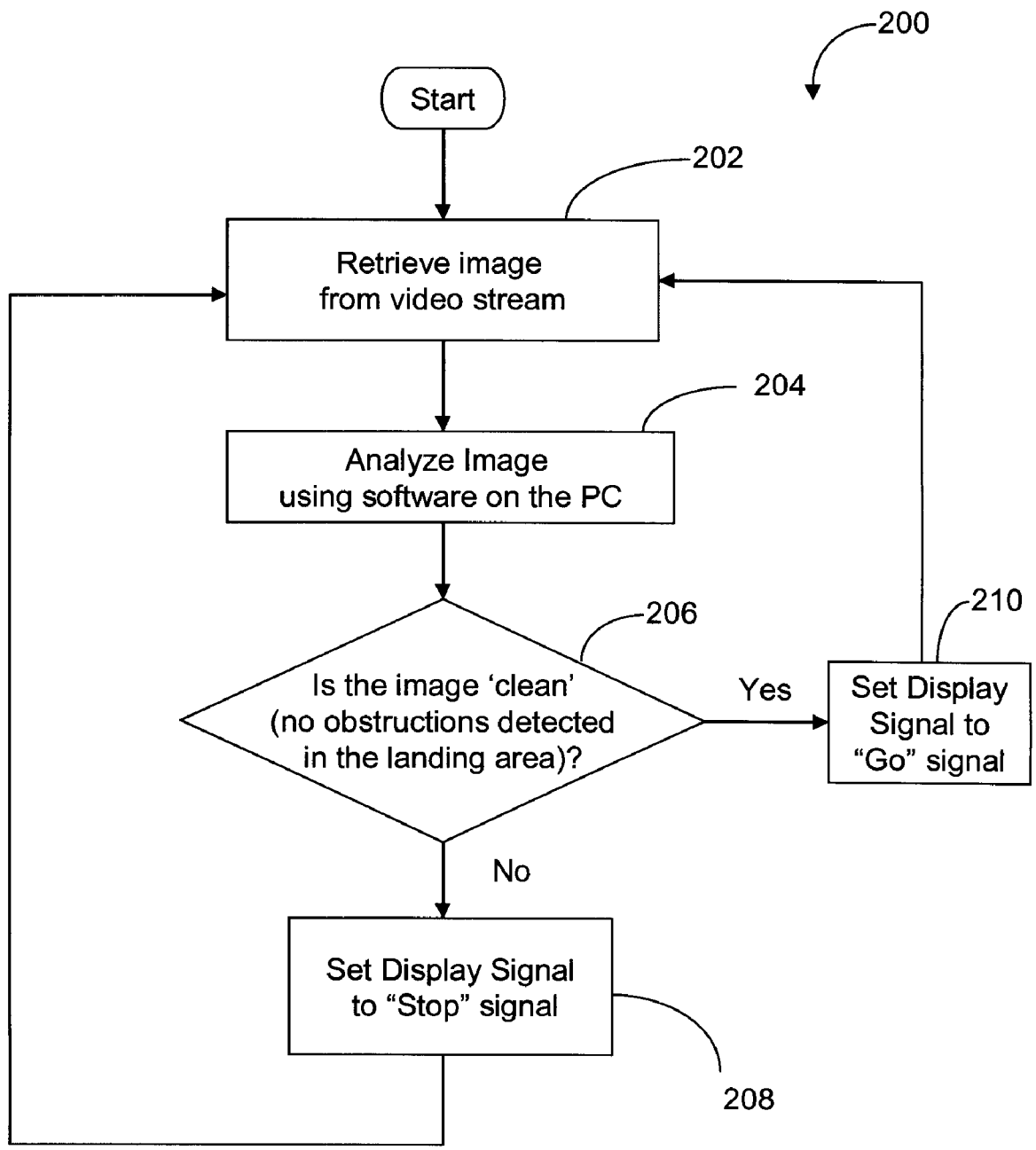

FIG. 5 presents a flow chart of an illustrative method for monitoring a landing area associated with a jump.

Figure 6:
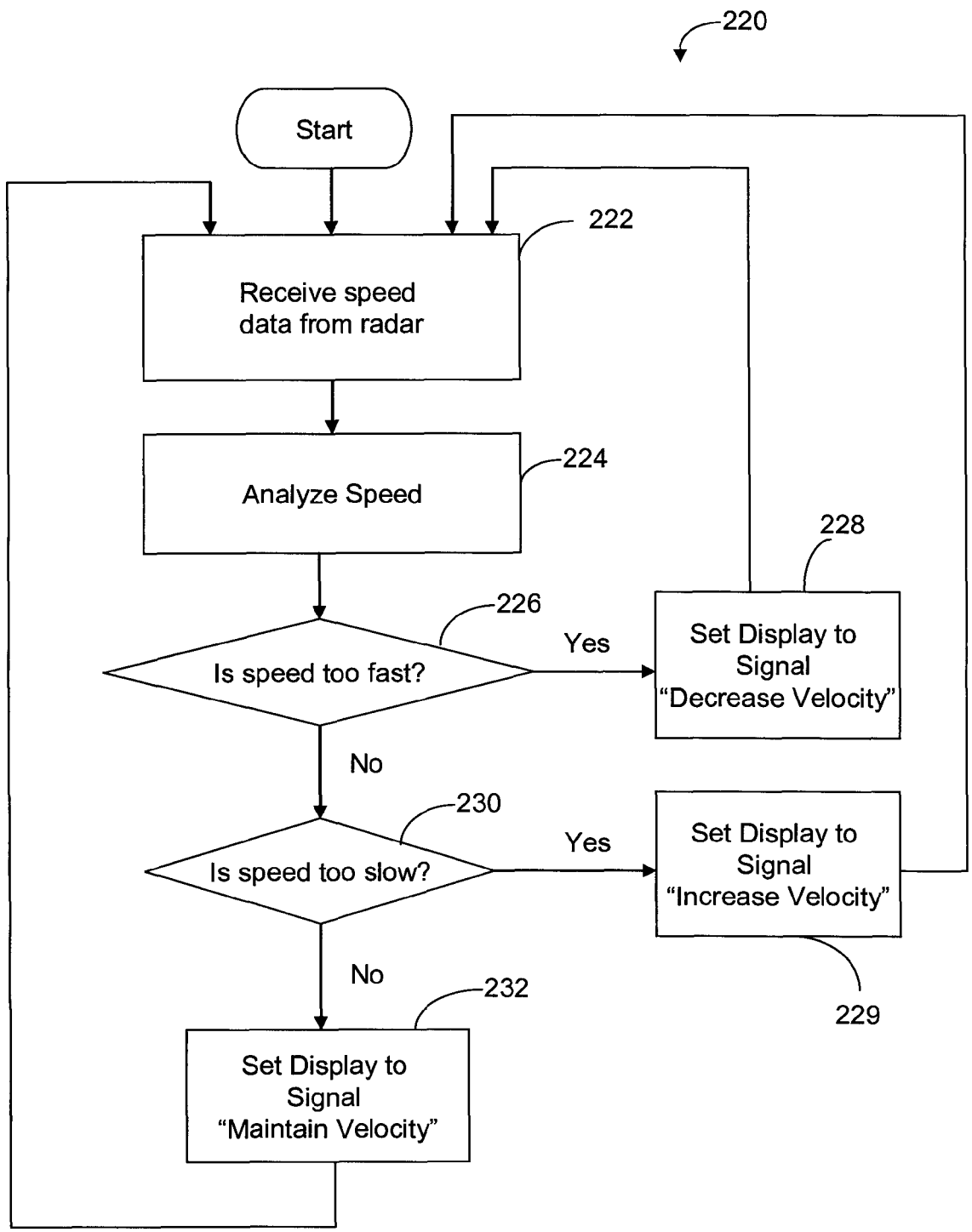

FIG. 6 presents a flow chart of an illustrative method for monitoring jump velocity associated with a jump.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and apparatus described hereinafter may vary as to configuration and as to details. Additionally, the methods may vary as to details, order of the actions, or other variations without departing from the illustrative methods disclosed herein.

A jump safety apparatus, system and method are described. The jump safety apparatus, system and method include either a monitoring jump landing area component, a monitoring jump velocity component, or a combination thereof. The monitoring jump landing area component monitors a jump landing area for obstructions in an automated real-time manner. The monitoring jump velocity component communicates whether the rider has achieved a satisfactory jump velocity. The system for monitoring the jump landing area can operate independently of the system for monitoring a jump velocity, or the systems may operate in an integrated fashion. The illustrative embodiments described below present a single housing embodiment that includes either the monitoring landing area systems, or the monitoring jump velocity systems, or the combination thereof.

Figure 1:
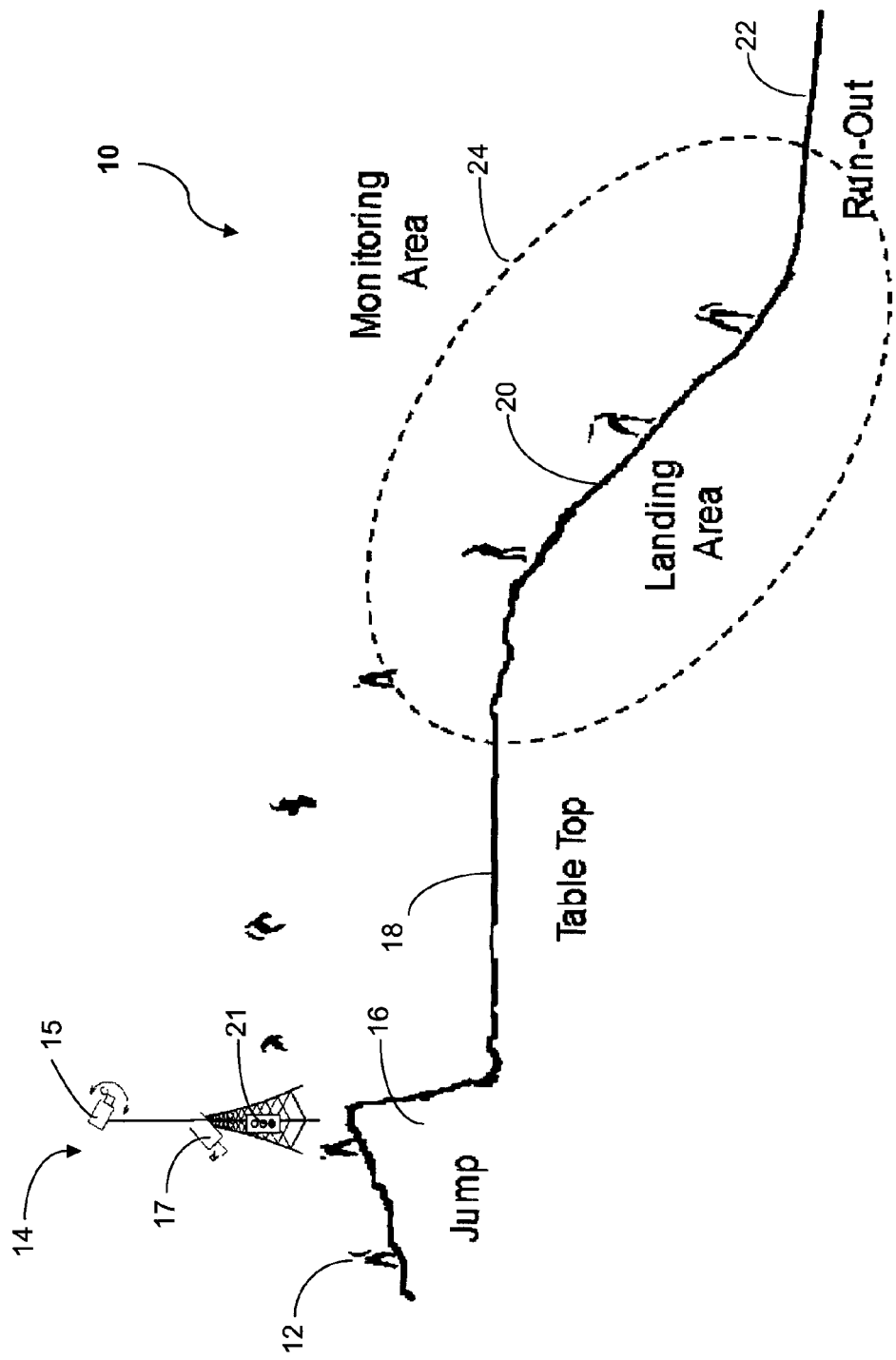
FIG. 1 shows a side view of a jump illustrating the parts of a jump and a monitoring area.

Referring to FIG. 1, there is shown a side view of a jump illustrating the parts of a jump and the monitoring area. The side view of a typical jump area 10 includes a rider 12 and an illustrative jump safety apparatus 14. The illustrative jump safety apparatus 14 includes either a monitoring jump landing area component represented by a camera 15, a monitoring jump velocity component represented by a radar component 17, or a combination thereof.

In FIG. 1, the rider 12 approaches the jump 16 and increases velocity along a path that leads up to the jump. The illustrative jump safety apparatus 14 is placed near the jump 16 in such a way that camera 15 is elevated and has a view of a landing area 20. The light emitting output 21 is visible to riders as they approach the jump.

There are various parts to jump area 10. The jump 16 includes an angled portion of the jump area where the rider breaks contact with the snow and becomes airborne. A table top 18 is adjacent to the jump and provides a relatively flat area that precedes a landing area 20. The landing area 20 is the zone where rider 12 typically makes contact with the snow after a successful jump. A run-out area 22 that is adjacent the landing area is where riders slow down after a jump.

An illustrative monitoring area 24 depicts the area being monitored and analyzed by the monitoring jump landing area system. As depicted in the drawing, the monitoring area includes all or part of the landing area and may also include portions of the tabletop or run-out areas.

Figure 2:
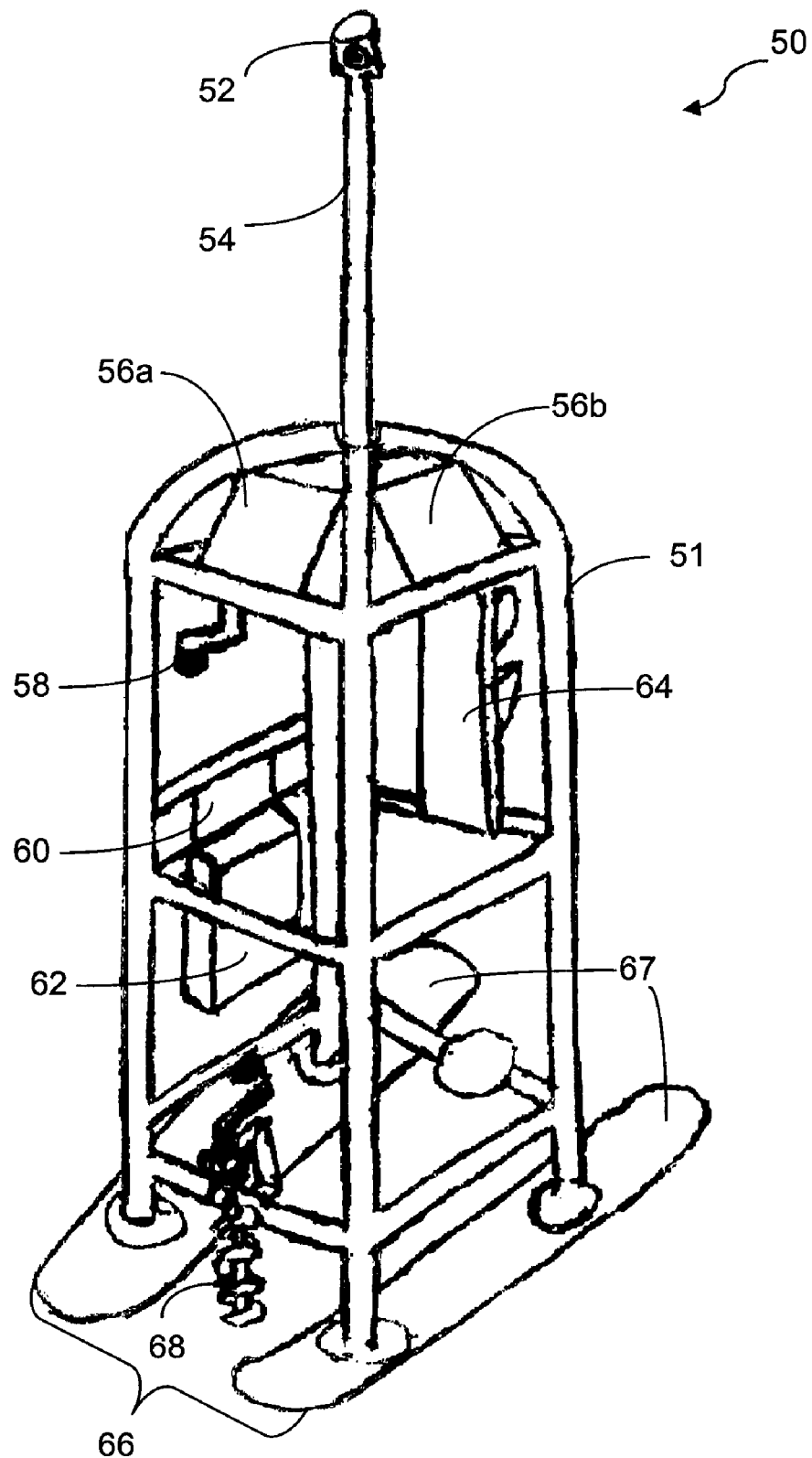
FIG. 2 shows an isometric view of an illustrative jump safety apparatus having an integrated housing.

Referring to FIG. 2, there is shown an isometric view of an illustrative jump safety apparatus having an integrated housing. The illustrative jump safety apparatus 50 includes an integrated weatherproof housing 51 having mounted thereon either the monitoring jump landing area component 15, or monitoring jump velocity component 17, or the combination thereof.

The illustrative monitoring jump landing area component 15 includes a camera 52 mounted on the weatherproof housing 51 atop a mounting pole 54 that is extensible using hand crank 58. In operation, hand crank 58 can be turned manually to raise pole 54, allowing the camera to be positioned at a high vantage point to gain a better view of the monitoring area.

Additionally, the monitoring jump velocity component 17 generates or determines a measured velocity. The monitored jump velocity component 17 may be mounted on the integrated weatherproof housing 51. By way of example and not of limitation, a velocity means such as a radar component may be used to generate a velocity output that provides a velocity along a path associated with the illustrative jump 16. The velocity output may also be referred to as the measured velocity.

In one embodiment, the velocity measurement is communicated using a light emitting component or other such means for communicating the velocity. In another embodiment, the velocity measurement is communicating with an increase velocity status determined by the velocity processing module having the velocity output below the optimal velocity range, a decrease velocity status determined by the velocity processing module having the velocity output above the optimal velocity range, and a maintain velocity status determined by the velocity processing module having the velocity output within the optimal velocity range. In yet another embodiment, the velocity measurement is communicated by providing an actual velocity or measured velocity output, the increase velocity status, the decrease velocity status, the maintain velocity status, or any combination thereof.

The illustrative radar component (not shown) can be mounted on the weatherproof housing 51 in a manner similar to camera 52. Thus, the radar component may be coupled to a mounting pole 54 that is extensible using hand crank 58. Alternatively, the radar component may be fixedly coupled to the weatherproof housing 51, without having to be fixedly coupled to the mounting pole 54.

The illustrative jump safety apparatus 50 with the integrated housing also includes a local power supply that delivers power to either the monitoring landing area component 15, or the monitoring jump velocity component 17, or the combination thereof. The illustrative power supply may include solar panels 56 that are mounted around the top of the frame beneath the camera 52 and mounting pole 54. The illustrative solar panels 56 supply the operating power for all powered components in this energy-efficient embodiment. The solar power supply also may include a battery back-up system 62 that is capable of providing power to the system for 8-12 hours.

In this illustrative embodiment, the camera is operatively coupled to a camera aiming system that includes a weatherproof LCD screen 60. The screen 60 displays the output of camera 52 and aids the user in establishing or correcting the monitoring area that is analyzed using camera 52. By way of example and not of limitation, beneath the screen is a computer housing 62 that includes a microprocessor and memory and battery back-up system. The computer housing may include a "Tiny PC", which refers to the PC being both compact in size and solid state. The computer housing 62 is also mounted in a weatherproof housing and is communicatively coupled to the camera 52 by Ethernet cable, USB connection, or any other video to PC capture device. The computer housing 62 is also communicatively coupled to a light emitting output 64. In this illustrative embodiment, the light emitting output 64 is an energy-efficient LED stoplight style display signal.

A surface positioning component 66 is mounted on the bottom of the integrated weatherproof housing 51. The surface positioning component 66 enables the jump safety apparatus 50 to be moved easily over snow and placed into a particular position for use. In this illustrative embodiment, the surface positioning component 66 includes a pair of skis 67 and snow screw 68. Once maneuvered into the desired position to monitor the jump, surface positioning component 66 allows the jump safety apparatus 50 to be firmly fastened into place with the snow screw 68.

An alternative to the surface positioning system 66 would be a fixed station as shown in FIG. 1 that is not movable. The fixed station may be camouflaged as a tree or other such stationary object and includes each of the elements of the jump safety apparatus described herein.

Referring to FIG. 3 there is shown a jump safety system diagram for monitoring either the landing area, or the jump velocity, or the combination thereof. The jump safety system 100 includes a camera 102 such as a weatherproof camera that can stream live video. The camera positioning module 104 is operatively coupled to the camera 102 and controls camera movement, including performing pan, tilt, and zoom functions. Additionally, the camera positioning module 104 may be configured to control camera altitude on mounting pole 54 by controlling a motor (not shown) that can move the mounting pole 54 to the desired elevation.

A camera aiming module 106 is operatively coupled to the camera 102 and the camera positioning system 104. The camera aiming module 106 aims and focuses the camera 102 on a user-defined monitoring area 24 shown in FIG. 1. In one illustrative embodiment, the camera aiming module 106 uses laser pointers mounted on or near the camera to delineate the corners of the monitoring area on the snow. The camera aiming module 106 may also provide an LCD screen output that is capable of displaying the camera output and enables a user to select a user-defined monitoring area, e.g. a window, within the display.

In the illustrative embodiment, the camera 102, camera positioning module 104 and camera aiming module 106 are separate components that are communicatively coupled to microprocessor 108. Alternatively, the microprocessor 108 may be configured to perform the operations of the camera positioning module 104 and the camera aiming module 106, enabling the camera 102 to simply be connected to a PC having a microprocessor 108.

The illustrative processor 108 is configured to also have an image processing module 110. The image processing module 110 determines if the landing area is clear of obstructions by providing a landing area clear status or a landing area obstruction status. The landing area clear status indicates that the landing area is clear of obstructions. The landing area obstruction status indicates that there is an obstruction in the landing area. The image processing module 110 may be programmed using MATLAB® or other such image processing software that enables the monitored area 24 to be analyzed on a real-time basis to determine whether or not there is an obstruction in the monitoring area 24. Image processing techniques may include, but are not limited to, examining the image for a high concentration of closely grouped pixels with color saturation above a pre-selected threshold. Analysis techniques may also include comparing average light intensity between images.

A plurality of input/output (I/O) devices 114 are also communicatively coupled to the microprocessor 108. For example, one of the I/O devices 114 may include a touch screen LCD screen that enables the user to manually configure monitored landing areas surrounding areas of the jump site. Another illustrative I/O device 114 may be a keyboard that can be used to change user-selectable parameters associated with image processing module 110.

In the illustrative jump safety system 100, system power is supplied by power supply 116. In the illustrative embodiment, a solar power supply 118 and a battery backup 120 are employed. In another embodiment, the jump safety system 100 is capable of being powered by AC source 122. By way of example and not of limitation, the battery backup 120 is capable of supplying power for 8-12 hours when inclement weather may prevent the solar panels from supplying power for an extended period. The system power can be routed through the microprocessor 108 or power can be provided to each component separately. Means for remote monitoring of power supply status may also be associated with the power supply 116.

A light emitting output 124 is communicatively coupled to microprocessor 108 using a serial cable, USB, or any other PC compatible interface that allows transmission of signal status from the PC to the light emitting output 124. The light emitting output 124 communicates the current status of the monitored area based on the image analysis using the image processing techniques described above. If the image processing module 110 determines that the landing area is clear of obstructions, then a "Go" signal, e.g. green light, is communicated by the light emitting output 124. If the determination is made that there is an obstruction in the landing area, a "Stop" signal, e.g. red light, is communicated by the light emitting output 124. By way of example and not of limitation, the illustrative light emitting output 124 may be similar to a traffic light having a green signal light indicating "go" and a red signal light indicating "stop."

Additionally, there may be a landing area caution status that indicates that there may be an obstruction in the landing area. The landing area caution status may be indicated with an orange light indicating "caution." The caution status may be triggered by a variety of conditions such as poor weather visibility, changes to snow, an icy landing area, and other such instances that may trigger a caution status.

The jump safety system 100 is also configured to communicate an optimal velocity for a jump to a rider with a monitoring jump component system 17. The monitoring jump component includes a means for determining velocity such as a radar component 126. The radar component 126 transmits and receives radio signals and generates a velocity output. Additionally, the radar component 126 is positioned to determine velocity along a path associated with the jump. Radar aiming system 128 aims the radar gun along a path corresponding to the approaching riders.

In operation, the radar data from the radar component 126 is captured and stored in memory 112, which records the velocity output. The processor 108 is configured to analyze the velocity output with a velocity processing module 130.

The velocity processing module 130 is controlled by the processor 108 and an optimal velocity range for a particular landing area is determined. If a velocity is within the optimal range, the velocity processing module 130 determines that the velocity has a maintain velocity status. If a velocity is lower than the bounds of the optimal range, the velocity processing module 130 indicates an increase velocity or 'too slow' status. If a velocity is higher than the bounds of the optimal range, the velocity processing module 130 indicates a decrease velocity or 'too fast' status. Thus, an increase velocity status is associated with a velocity that is too slow and thus the rider must speed up to reach the optimal velocity range for the jump, and a decrease velocity status is associated with a velocity that is too fast and thus the rider must slow down to reach the optimal velocity range for the jump.

A separate light emitting output 132 is communicatively coupled to microprocessor 108 using a serial cable, USB, or any other PC compatible interface that allows transmission of signal status from the PC to the light emitting output 132. The light emitting output 132 communicates the current status of the approaching rider's velocity. The light emitting output may be configured in one of many similar ways, as described below. Generally, a combination of symbols, colors, phrases, and/or other visual signals (display flashing or changing color, for example), may be used to communicate the current velocity status to the rider. The display may be set to communicate the speed information directly to the rider.

If an increase velocity status is indicated by the velocity processing module 130, an increase velocity signal is communicated by the light emitting output 132. The increase velocity signal may be indicated using a symbol such as an upward arrow, a red upward arrow, and/or a red plus sign. The increase velocity signal may also be indicated using phrases such as "SPEED UP" and/or "TOO SLOW." The display may also flash at varying speeds or change colors to indicate that velocity status is approaching the optimal range or is about to drop into the sub-optimal range.

If a decrease velocity status is indicated by the velocity processing module 130, a decrease velocity signal is communicated by the light emitting output 132. The decrease velocity signal may be indicated using a symbol such as a downward arrow, a red downward arrow, and/or a red minus sign. The decrease velocity signal may also be indicated using phrases such as "SLOW DOWN" and/or "TOO FAST." The display may also flash at varying speeds or change colors to indicate that velocity status is approaching the optimal range or is about to exceed optimal range.

Additionally, there may be a velocity caution status that indicates that there is a particular challenge associated with determining the rider's velocity. The velocity challenge may be indicated with an orange light indicating "caution." The caution status may be triggered by a variety of conditions such as poor weather visibility, an inability to determine rider velocity, and other such instances that may trigger a caution status.

In the illustrative embodiment, the light emitting output 132 comprises an LCD or LED or similar type of display that is capable of displaying characters in at least two colors, such as red and green. The light emitting display 132 will display the rider's speed in one color (green in this illustrative embodiment) if the rider's velocity is within the optimal range. If the rider's speed is above the optimal range, the numbers on the display will turn another color (red in this illustrative embodiment), and an arrow will display next to the velocity readout to indicate the proper course of action to the rider, in this case, a downward arrow meaning "slow down." Similarly, if the rider's speed is below the optimal range, the velocity readout display will also be red, but the arrow will point upward to indicate that the rider needs to speed up. The arrows will flash slowly if the rider's speed is close to optimal, and will flash more quickly as the magnitude of the difference between the rider's speed and the optimal velocity range increases.

Referring to FIG. 4 there is shown a high-level flow chart of a method for performing the system operations described in FIG. 3. The method 150 is initiated at block 152 where either video from camera 102, or velocity information from radar 126, or the combination thereof is captured by the jump safety system 100.

In one embodiment, the method 150 then proceeds to block 154 where video data is processed to monitor the landing area associated with the jump. The jump safety method comprises positioning the camera 120 to display the landing area associated with the jump. As previously described, the landing area has a declining sloped angle that reduces a landing force in relation to the slope angle. The illustrative operations within block 154 then proceed to record and analyze the camera output. A landing area clear status can be determined by examining the landing area and determining the landing area is clear of obstructions. Additionally, a landing area obstruction status can be obtained by determining that there is an obstruction in the landing area. A monitoring area may be selected that includes the landing area. Alternatively, the monitoring area may simply include a portion of the landing area.

The method 150 may then proceed to block 156 where the velocity processing module may process data from radar component 126. The operations associated with radar processing at block 156 may occur independently of the video processing operations at block 154. The operations at block 154 and 156 may also occur in parallel. Additionally, even though the jump safety system 100 may be configured to perform both monitoring of landing area and communicating optimal jump velocity, there may be instances when either video processing 156 or video processing 154 is interrupted by weather, loss of power, improper set-up, or other such factors that may affect operation of jump safety system 100.

In the illustrative method 150, the radar processing 156 includes positioning a means for determining velocity, e.g. radar component 126, along a path that is associated with the jump. The radar processing operations 156 may also include selecting an optimal velocity range for the landing area and recording a velocity output. In operation, the velocity output is analyzed and either a decrease velocity status, an increase velocity status, or a maintain velocity status is obtained. The increase velocity status is determined by having the velocity output exceed the optimal velocity range. The decrease velocity status is determined by having the velocity output below the optimal velocity range. The maintain velocity status is determined by having the velocity output within the optimal range.

The method then proceeds to block 158 where a light emitting output, e.g. display, communicates either a landing area status, or a jump velocity status, or a combination thereof. The landing area status and/or jump velocity status is communicated on a real-time basis as described herein. Thus, with respect to the landing area status, either the landing clear status or the landing area obstruction status is communicated to the light emitting output 124 at block 158. With respect to the jump velocity status, either the increase velocity status, the decrease velocity status, or the maintain velocity status is communicated to the light emitting output 132 at block 158.

In yet another embodiment, the logic associated with the landing area status and jump velocity status may be communicated to an integrated, i.e. single, light emitting output (not shown). This integrated light emitting output may also include a "caution" signal, e.g. orange output, that communicates that a clear reading has not been obtained.

Referring to FIG. 5 and FIG. 4, there is shown a flow chart of an illustrative method 200 for monitoring a landing area associated with a jump. By way of example and not of limitation, the illustrative method 200 corresponds to the video processing operations in block 154. The illustrative method is initiated at block 202 where one or more images are retrieved from the video stream captured from camera 102. Generally, these images are captured for a particular period of time and the images are analyzed for changes at block 204 where an illustrative video image is analyzed by the microprocessor 108 using the image processing module 110.

The method then proceeds to decision diamond 206 where a determination is made whether the image is free of obstructions in landing area 20, i.e. clean image, or whether there are obstruction in the monitored landing area, i.e. dirty image. The dirty image is associated with the landing area obstruction status. The clean image is associated with the landing clear status described above. If the determination is made that there are obstructions, the method proceeds to block 208 where the light emitting output 124 communicates an illustrative "Stop" signal with an illustrative red light.

If the decision at diamond 206 is that there are no obstructions, e.g. clean images have been captured for an illustrative 10-second period, then the method proceeds to block 210 where the light emitting output 124 communicates an illustrative "Go" signal with an illustrative green light. In either case, after step 208 or step 210, the process is repeated and method returns to block 202. In the preferred embodiment, the steps performed in method 200 are performed on a real-time or pseudo real-time basis.

Referring to now to FIG. 6, there is shown a flow chart of an illustrative method 220 for monitoring jump velocity. The illustrative method 220 is associated with the operations referred to in radar processing block 156 presented in FIG. 4. The illustrative method 220 is initiated at block 222 where speed data from an illustrative radar component 126, e.g. a radar gun, is communicated to the microprocessor 108. The method then proceeds to block 224 where the radar data is analyzed. Alternatively, another means for determining velocity may be employed such as a second camera (not shown) that can be used to determine rider velocity along a path leading up to the jump.

The method then proceeds to decision diamond 226 where a determination is made whether the rider's speed is above the upper bound of the optimal range. Note, the term "speed" is used interchangeably with "velocity," even though velocity is typically associated with a vector space and speed is not associated with a vector. If the rider's speed exceeds the upper bound of the optimal velocity, the method continues to block 228 where the light emitting output 132 communicates a decrease velocity signal, such as a downward arrow or other signal as discussed above.

The method 220 then proceeds to decision diamond 230 where a determination is made if the rider's speed is below the lower bound of the optimal range. If the rider's speed is below lower bound of the optimal range, the method continues to block 229 where the light emitting output 132 communicates the increase velocity signal, such as an upward arrow or other signal as discussed above.

If the rider's speed is within the optimal range, the process continues to block 232 where the light emitting output 132 communicates a maintain velocity status, such as an equal sign or other signal as discussed above.

It is to be understood that the foregoing is a detailed description of illustrative embodiments. The scope of the claims is riot limited to these specific embodiments or examples. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A jump safety system for monitoring a landing area associated with a jump, the system comprising:
   a portable integrated housing configured to be positioned in a fixed location;
   a camera coupled to the integrated housing that is positioned in the fixed location, the camera configured to capture a real-time image and configured to generate a camera output that includes the landing area, wherein the landing area has a declining sloped angle;
   a computer housing coupled to the portable integrated housing that is positioned in the fixed location, the computer housing includes,
      a memory that records the camera output,
      a processor configured to analyze the camera output stored in the memory,
      an image processing module controlled by the processor that indicates a landing area clear status by determining the landing area is clear of obstructions,
      a landing area obstruction status determined by the image processing module indicating that there is an obstruction in the landing area, and
   a light emitting output coupled to the portable integrated housing that communicates the landing area clear status or the landing area obstruction status.

2. The system of claim 1 further comprising a camera positioning module configured to position the camera using at least one of a pan operation, a tilt operation, and a zoom operation.

3. The system of claim 2 further comprising a camera aiming module configured to aim the camera to a monitoring area, wherein the monitoring area includes the landing area.

4. The system of claim 2 further comprising a camera aiming module configured to aim the camera to a monitoring area, wherein the monitoring area includes a portion of the landing area.

5. The system of claim 1 further comprising:
   a means for determining velocity along a path that is associated with the jump, wherein the velocity means includes,
      a velocity output, and
      a velocity module that associates an optimal velocity range with the landing area.

6. The system of claim 5 wherein the processor is configured to analyze the velocity output and determine an increase velocity status having the velocity output below the optimal velocity range, a decrease velocity status having the velocity output above the optimal velocity range, or a maintain velocity status having the velocity output within the optimal range.

7. The system of claim 6 wherein the processor is configured to communicate the increase velocity status, the decrease velocity status, and the maintain velocity status to the light emitting output.

8. The system of claim 6 wherein the processor is configured to communicate the measured velocity output to the light emitting output.

9. The system of claim 6 wherein the processor is configured to communicate the measured velocity output, the increase velocity status, the decrease velocity status, and the maintain velocity status to the light emitting output.

10. A jump safety system for monitoring a landing area for a jump, the system comprising:

a portable integrated housing configured to be positioned in a fixed location;

a camera coupled to the integrated housing that is positioned in the fixed location, the camera configured to capture a real-time image and configured to generate a camera output that includes the landing area, wherein the landing area has a declining sloped angle;

a computer housing coupled to the portable integrated housing that is positioned in the fixed location, the computer housing includes, a memory that records the camera output, a processor configured to analyze the camera output stored in the memory, an image processing means that indicates a landing area clear status by determining the landing area is clear of obstructions, a landing area obstruction status determined by the image processing means indicating that there is an obstruction in the landing area; and an indicating means that communicates at least one of the landing area clear status and the landing area obstruction status.

11. The system of claim 10 further comprising a camera positioning module configured to position the camera using at least one of a pan operation, a tilt operation, and a zoom operation.

12. The system of claim 10 further comprising a camera aiming module configured to aim the camera to a monitoring area, wherein the monitoring area includes the landing area.

13. The system of claim 11 further comprising a camera aiming module configured to aim the camera to a monitoring area, wherein the monitoring area includes a portion of the landing area.

14. The system of claim 10 further comprising:

a means for determining velocity along a path that is associated with the jump, wherein the velocity means includes, a velocity output, and a velocity module that associates an optimal velocity range with the landing area.

15. The system of claim 14 wherein the processor is configured to analyze the velocity output and determine an increase velocity status having the velocity output below the optimal velocity range, a decrease velocity status having the velocity output above the optimal velocity range, or a maintain velocity status having the velocity output within the optimal range.

16. The system of claim 15 wherein the processor is configured to communicate the increase velocity status, the decrease velocity status, and the maintain velocity status to the light emitting output.

17. The system of claim 15 wherein the processor is configured to communicate the measured velocity output to the light emitting output.

18. The system of claim 15 wherein the processor is configured to communicate the measured velocity output, the increase velocity status, the decrease velocity status, and the maintain velocity status to the light emitting output.

19. A jump safety method for monitoring a landing area associated with a jump, the method comprising:

positioning a portable integrated housing in a fixed location;

positioning a camera that is coupled to the portable integrated housing in the fixed location, the camera configured to capture a real-time image and configured generate a camera output that includes the landing area associated with the jump, wherein the landing area has a declining sloped angle that reduces a landing force in relation to the slope angle;

recording the camera output;

analyzing the camera output with a memory and a processor associated with a computer housing that is coupled to the portable integrated housing;

determining a landing area clear status by determining the landing area is clear of obstructions;

determining a landing area obstruction status by determining that there is an obstruction in the landing area; and communicating at least one of the landing area clear status and the landing area obstruction status to a light emitting output that is coupled to the portable integrating housing.

20. The method of claim 19 further comprising selecting a monitoring area that includes the landing area.

21. The method of claim 20 further comprising identifying the monitoring area by aiming the camera at a portion of the landing area.

22. The method of claim 19 further comprising:

positioning a means for determining velocity along a path that is associated with the jump;

selecting an optimal velocity range for the landing area; and recording a velocity output.

23. The method of claim 22 further comprising:

analyzing the velocity output; and determining an increase velocity status by having the velocity output below the optimal velocity range;

determining a decrease velocity status by having the velocity above the optimal velocity range; and determining a maintain velocity status by having the velocity within the optimal velocity range.

24. The method of claim 23 further comprising communicating the increase velocity status, the decrease velocity status, and the maintain velocity status to the light emitting output.

25. The method of claim 23 further comprising communicating the measured velocity output to the light emitting output.

26. The method of claim 23 further comprising communicating the measured velocity output, the increase velocity status, the decrease velocity status, and the maintain velocity status to the light emitting output.

* * * * *